July 25, 1939.  B. H. CARROLL  2,166,938
PHOTOGRAPHIC EMULSION
Filed March 29, 1937
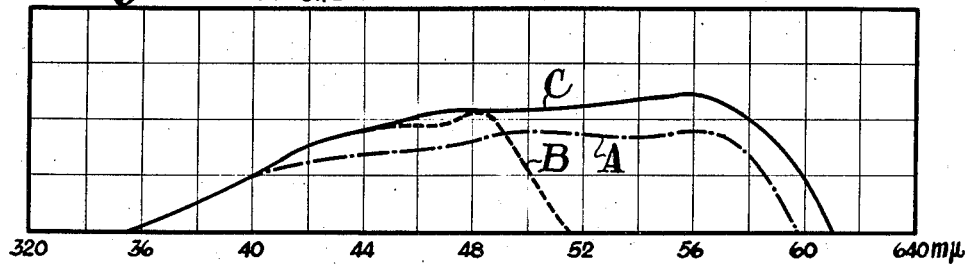
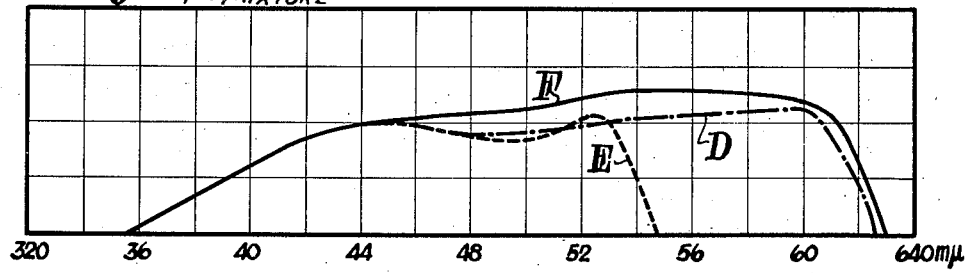
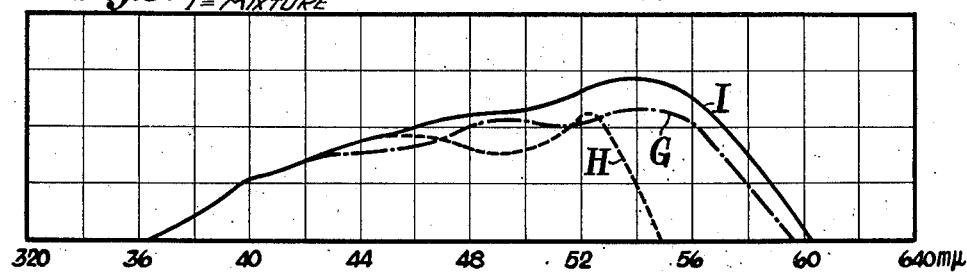
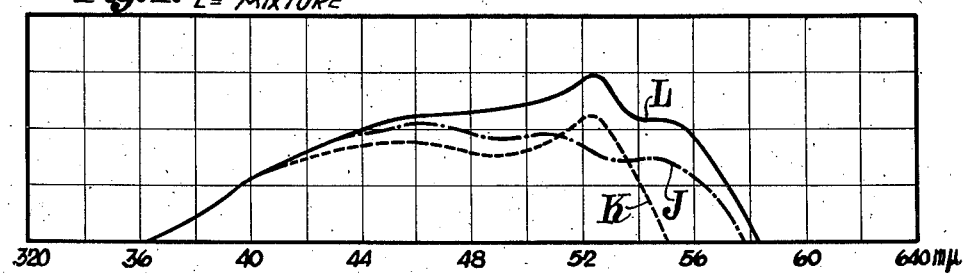
Burt H. Carroll,
INVENTOR.
BY
ATTORNEYS.

Patented July 25, 1939

2,166,938

UNITED STATES PATENT OFFICE 2,166,938

PHOTOGRAPHIC EMULSION

Burt H. Carroll, Rochester, N. Y., assignor to Eastman Kodak Company, Rochester, N. Y., a corporation of New Jersey Application March 29, 1937, Serial No. 133,589

13 Claims. (Cl. 95—7)

This invention relates to sensitized photographic emulsions and more particularly to photographic emulsions, such as those of the gelatino-silver-halide type, containing a mixture or combination of two or more sensitizing materials, at least one of which cooperates with at least one other to alter the sensitivity of the emulsion to a greater degree than is possible with any one of the sensitizing materials alone. The sensitization produced by my combinations is always greater, in some spectral region, than the sum total of the sensitizations produced by the separate sensitizing materials. The sensitizing materials of my combinations are substances generally referred to as dyes and more particularly as dyes of the cyanine class.

It is known in the art of making photographic emulsions that certain dyes of the cyanine class alter the sensitivity of photographic emulsions of the gelatino-silver-halide type, when incorporated therein. The sensitizing effect produced by the dyes does not increase proportionally to the amount of dye, but passes through a maximum as the concentration is increased. Within the range of concentration most useful in practice, the sensitivity increases much more slowly than the concentration of the dye. Likewise, the combined effect of two or more dyes on an emulsion is rarely equivalent to the sum of their separate effects, in general it is much less. Most commonly, the combined effect is no greater than the effect of a single one of the dyes employed in a concentration equal to the sum of the concentrations of all the dyes in the combination. Very frequently, the combined effect of two dyes is less than that of one of them alone.

I have found with certain mixtures or combinations of two or more cyanine dyes, that the sensitization is substantially greater, in some spectral region, than that of any one of the dyes in the absence of the other or others. I will call this phenomenon supersensitization. In general, at least one dye of my combination may be said to be supersensitized by the other or others. The dye which is supersensitized may be called the basic sensitizer and the other dye the supersensitizer. However, the effect may be mutual and the dyes indistinguishable from the standpoint of which is supersensitized.

Supersensitization is a specific phenomenon and is found only in mixtures or combinations of dyes from certain groups. Supersensitization can be most readily observed, when a dye is supersensitized in a spectral region for which the other dye does not sensitize; for example, when the red sensitization produced by dye A increases in the presence of dye B which sensitizes only for the green. When two or more dyes sensitize for approximately the same or widely overlapping spectral regions (as in a number of the cases to be described in the instant application), supersensitization can still be detected, because if supersensitization obtains in such cases, the total optical sensitization produced by a combination of two or more dyes will always be greater, under favorable conditions, than that which can be produced by any dye of the combination alone at any concentration The magnitude of supersensitization depends upon the relative and absolute concentrations of the dyes in the emulsion and on the type of emulsion. In the instant application, the supersensitizing effects have been clearly demonstrated under suitable conditions which are applicable to commercial practice.

This application deals with emulsions containing supersensitizing mixtures or combinations of one or more 8-alkyl unsymmetrical carbocyanine dyes, in which one of the heterocyclic nuclei is an arylo-oxazole nucleus, such as benzoxazole or naphthoxazole, for example, and the other heterocyclic nucleus is an arylothiazole or aryloselenazole nucleus, such as benzothiazole, benzoselenazole and naphthothiazole, for example, together with one or more pseudocyanine dyes. Just how the dyes of my mixtures cooperate to give a supersensitizing effect is not known. I shall refer to the mixtures as combinations, although I do not intend to imply that the dyes are chemically combined.

An object of my invention, therefore, is to provide photographic emulsions containing a supersensitizing combination of cyanine dyes. A further object is to provide a process for sensitizing photographic emulsions with supersensitizing combinations of dyes and to provide a method of increasing the yellow and green sensitivity of emulsions sensitized to the yellow and green regions of the spectrum. A still further object is to provide a photographic element comprising a support coated with such supersensitized emulsions. Other more specific objects will become apparent hereinafter.

The dyes which I employ in my supersensitizing combinations are sensitizers of photographic emulsions when used therein alone. While there is more than one manner of formulating and naming the dyes which I employ in practicing my invention, it is believed that the formulas, systems of nomenclature and names used herein are in accordance with those used during the development of the cyanine dye art to its present stage. The most probable formulas of representative dye-types are given below, in order to clearly set forth the nature of the materials employed in my supersensitizing mixtures. These formulas should not be construed as limiting my invention, except as indicated in the appended claims.

Among the 8-alkyl unsymmetrical carbocyanine dyes useful in practicing my invention are the following:

The 8-alkyloxathiacarbocyanines, which can be represented by the following general formula:

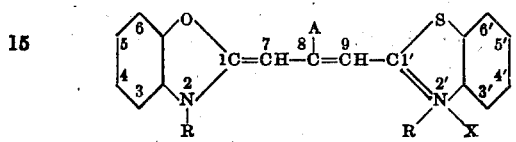

The 8-alkyloxaselenacarbocyanines, which can be represented by the following general formula:

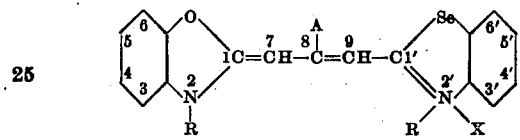

The 8-alkyl-3,4-benzoxathiacarbocyanines, which can be represented by the following general formula:

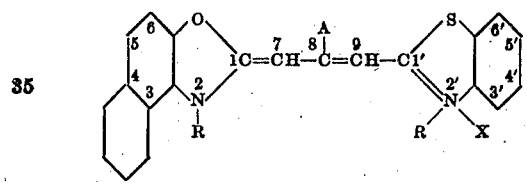

The 8-alkyl-3,4-benzoxaselenacarbocyanines, which can be represented by the following general formula:

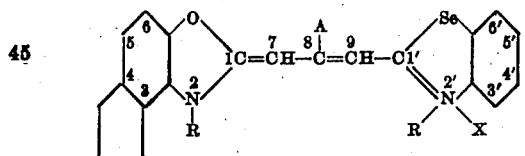

The 8-alkyl-3',4'-benzoxathiacarbocyanine, which can be represented by the following general formula:

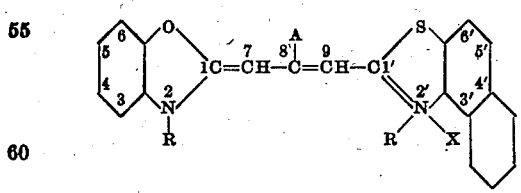

The 8-alkyl-3,4,3',4'-dibenzoxathiacarbocyanines, which can be represented by the following general formula:

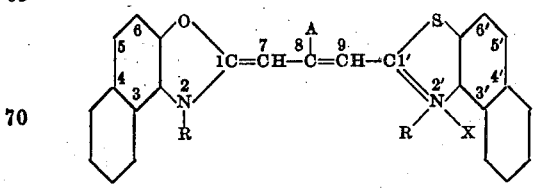

In all of the above formula, A, R and R' represent alkyl groups and X represents an acid radical. I have found it convenient to employ the carbocyanine dye-iodides (where X represents iodine) in practicing my invention. However, other dye-salts, such as the chlorides, bromides, perchlorates, alkyl-sulfates, alkyl-p-toluenesulfonates can be employed, for example. I have found it advantageous to employ dyes wherein A represents methyl or ethyl and R and R' represent an alkyl group of one to four carbon atoms, such as methyl, ethyl, n-butyl, β-hydroxyethyl, isobutyl or the like, in practicing my invention. More specifically I have found the dyes wherein A represents methyl or ethyl and R and R' represent ethyl to be especially useful. The nuclei of the dyes can carry simple substituents which do not interfere with sensitizing properties, such as, for example, alkyl, alkoxy, chloro or amino groups.

These 8-alkyl unsymmetrical carbocyanine dyes can be prepared according to the method described in the copending application of Leslie G. S. Brooker and Frank L. White, Serial No. 30,736, filed July 10, 1935. The method of Brooker and White comprises reacting, in the presence of a water-binding agent, e. g. acetic anhydride, a 1-methylbenzoxazole or μ-methylnaphthoxazole quaternary salt with an acylmethylene derivative of the following formula:

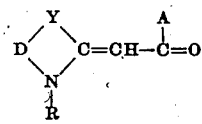

wherein A and R represent alkyl groups, D represents a phenylene or a naphthylene group and Y represents sulfur or selenium.

Among the pseudocyanine dyes useful in practicing my invention are the following:

The 2,2'-cyanine dyes which can be represented by the following general formula:

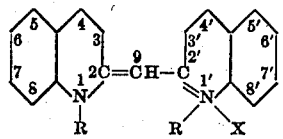

The thia-2'-cyanine dyes which can be represented by the following general formula:

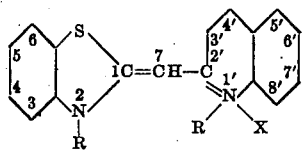

The selena-2'-cyanine dyes which can be represented by the following general formula:

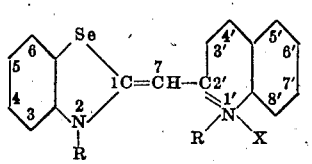

The oxazolo-2'-cyanine dyes which can be represented by the following general formula:

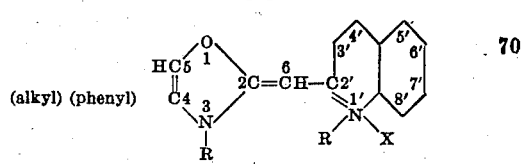

The benzothia-2′-cyanine dyes which can be represented by the following general formula:

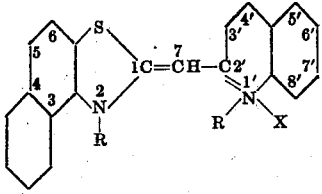

In all of the above formulas of pseudocyanine dyes R and R′ represent alkyl groups and X represents an acid radical. The oxazolo-2′-cyanine dyes can be substituted in the 5-position with substituents, such as alkyl groups or aryl groups of the benzene series, for example phenyl. In practicing my invention I have found it convenient to employ the pseudocyanine dye-iodides (wherein X represents iodine). However, other pseudocyanine salts can be employed, such, for example, as the chlorides, bromides, perchlorates, alkylsulfates or alkyl-p-toluenesulfonates. I have found it advantageous to employ pseudocyanine dyes wherein R and R′ represent an alkyl group of one to four carbon atoms, such as methyl, isobutyl, ethyl, n-butyl, allyl or β-hydroxyethyl, for example. The dyes wherein R and R′ represent ethyl are particularly useful in practicing my invention. The pseudocyanine dyes can be substituted in their nuclei with simple substituents which do not interfere with sensitizing properties, such for example, as alkyl, chloro, alkoxy or amino groups.

Brooker and Keyes in the Journal of the American Chemical Society, vol. 57, pages 2488–2491 (1935) have reviewed the literature pertaining to pseudocyanine dyes and describe methods for the preparation thereof. Oxazolo-2′-cyanine dyes are described in U. S. Patent No. 1,969,446.

The objects of my invention can be accomplished by merely incorporating one or more sensitizing 8-alkyl unsymmetrical carbocyanine dyes together with one or more sensitizing pseudocyanine dyes capable of supersensitizing the 8-alkyl-carbocyanine dye in a photographic emulsion. My invention is particularly directed to the ordinarily employed gelatino-silver-halide emulsions. However, my supersensitizing combinations can be employed in emulsions in which the carrier is other than gelatin, for example, a resinous substance or cellulosic derivative which has substantially no deleterious effect on the light-sensitive materials. As silver halide emulsions, I include such emulsions as are commonly employed in the art, for example, silver chloride or silver bromide emulsions which can contain other salts which may be light-sensitive. By way of illustration, the herein described supersensitized emulsions were prepared employing an ordinary gelatino-silver-bromide emulsion of ordinary concentration (approximately 40 g. of silver halide, per liter). The dyes were generally employed in concentrations in the order of 10 mg. each, per liter of ordinary emulsion, but can be employed in concentrations several times greater or less than that. The ratio of concentration of the 8-alkyl unsymmetrical carbocyanine dye to the concentration of pseudocyanine dye may be varied widely from 5:1 to 1:5, for example. The most favorable conditions for supersensitization of the desired magnitude must be determined by experiment, the manner of which will be apparent to those skilled in the art upon a complete perusal of these specifications.

The methods of incorporating dyes in emulsions are simple and well known to those skilled in the art. In practicing my invention, the dyes of my combinations can be added separately or together. It is convenient to add dyes separately in the form of their solutions in appropriate solvents. The solvent must, of course, be compatible with the emulsion, substantially free from any deleterious effect on the light-sensitive materials and capable of dissolving the dyes. Methanol has proven satisfactory as a solvent for the dyes in practicing my invention. The dyes are advantageously incorporated in the finished, washed emulsion and should be uniformly distributed throughout the emulsion. The emulsion can then be converted into a photographic element by coating upon a support, such as glass, cellulose acetate, cellulose nitrate, other cellulose derivative or resin, in a manner well-known in the art.

The following combinations or mixtures of dyes are illustrative of my invention. These illustrations are not intended to be limiting:

| 8-alkyl unsymmetrical carbocyanines | | Pseudocyanine |
| --- | --- | --- |
| 2,2′-diethyl-8-methyl - 3′,4′ - benzoxathiacarbocyanine iodide | with | 3,1′-diethyl-4- phenyloxazolo-2′-cyanine iodide |
| 2,2′-diethyl-8-methyl - 3′,4′ - benzoxathiacarbocyanine iodide | with | 2,1′ - diethylthia-2′-cyanine iodide |
| 2,2′ - diet'. 1 - 8 - methyloxathiacarbocyanine iodide | with | 2,1′ diethyl - 4 - chlorothia-2′-cyanine iodide |
| 2,2′ - dimethyl - 8 - ethyloxathiacarbocyanine iodide | with | 2,1′ - diethylthia-2′-cyanine iodide |
| 2,2′ - dimethyl - 8 - ethyl-3′,4′- benzoxathiacarbocyanine iodide | with | 2,1′ - diethylthia-2′-cyanine iodide |
| 2,2′ - diethyl - 8 - methyl-3′,4′-benzoxathiacarbocyanine iodide | with | 2,1′-diethyl-4-chlorothia-2′-cyanine iodide |
| 2,2′ - diethyl - 8 - methyl-3,4-benzoxathiacarbocyanine iodide | with | 3,1′-diethyl-4-phenyloxazolo-2′-cyanine iodide |
| 2,2′,8 - triethyloxaselena - carbocyanine iodide | with | 2,1′-diethyl-4-chlorothia-2′-cyanine iodide |

While I have illustrated only combinations containing one 8-alkyl unsymmetrical carbocyanine and one pseudocyanine, my combinations can as well contain one 8-alkyl unsymmetrical carbocyanine cooperating with two pseudocyanines to give a supersensitizing effect. Likewise, my combinations can contain two pseudocyanines cooperating with one 8-alkyl unsymmetrical carbocyanine.

8-alkyl unsymmetrical carbocyanine or pseudocyanine dyes containing the 5,6-benzothia nucleus are almost generally of lesser utility in practicing my invention. Combinations containing such dyes ordinarily show smaller, and in many cases much smaller supersensitizing effects. Among the oxazolo-2′-cyanines, those substituted in the 4-position of the oxazole nucleus by an alkyl group, such as methyl, or by an aryl group of the benzene series, such as phenyl, are especially useful in practicing my invention.

In general, it can be said of my combinations that the 8-alkyl unsymmetrical carbocyanine is the dye supersensitized (basic sensitizer) and the pseudocyanine is the supersensitizer. However, the nature of this relationship between the dyes of my combinations is frequently difficult to determine and is, in fact, immaterial to the practice of my invention.

The accompanying drawing is by way of illustrations and depicts the supersensitizing effect of four of my new combinations. Each figure of the drawing is a diagrammatic reproduction of three spectrograms showing, first, the sensitivity of a silver bromide emulsion containing an 8-alkyl unsymmetrical carbocyanine dye (represented by the dot-and-dash line in each figure), second, the sensitivity of the same silver bromide emulsion containing a pseudocyanine dye (represented by the dotted line in each figure)

and third, the sensitivity of the same emulsion containing a mixture or combination of the said 8-alkyl unsymmetrical carbocyanine dye with the said pseudocyanine dye (represented by the solid line in each figure). The supersensitizing effect is apparent from the drawing.

More specifically, in Fig. 1 curve A represents the sensitivity of an ordinary gelatino-silver-halide emulsion containing 2,2'-diethyl-8-methyl-3,4-benzoxathiacarbocyanine iodide in a concentration of about 10 mg. per liter of emulsion; curve B represents the sensitivity of the same emulsion containing 3,1'-diethyl-4-phenyloxazolo-2'-cyanine iodide in a concentration of about 10 mg. per liter of emulsion, and curve C represents the same emulsion containing 2,2'-diethyl-8-methyl-3,4-benzothiacarbocyanine iodide and 3,1'-diethyl-4-phenyloxazolo-2'-cyanine iodide in concentrations of 10 and 20 mg. per liter of emulsion, respectively. The sensitivity of the emulsion represented by curve C, measured through a Wratten 12 filter is 60% greater than that of the emulsion represented by curve A.

In Fig. 2, curve D represents the sensitivity of an ordinary silver bromide emulsion containing 2,2'-dimethyl-8-ethyl-3',4'-benzoxathiacarbocyanine iodide in a concentration of about 10 mg. per liter; curve E represents the same emulsion containing 2,1'-diethylthia-2'-cyanine iodide in a concentration of about 20 mg. per liter, and curve F represents the sensitivity of the same emulsion containing 2,2'-dimethyl-8-ethyl-3',4'-benzoxathiacarbocyanine iodide and 2,1'-diethylthia-2'-cyanine iodide in concentrations of about 10 and 20 mg. per liter, respectively. The sensitivity of the emulsion represented by curve F, measured through a Wratten 25 (A) filter is 100% greater than that of the emulsion represented by curve D.

In Fig. 3, curve G represents the sensitivity of an ordinary silver bromide emulsion containing 2,2'-diethyl-8-methyl-oxathiacarbocyanine iodide in a concentration of about 10 mg. per liter; curve H represents the sensitivity of the same emulsion containing 2,1'-diethyl-4-chlorothia-2'-cyanine iodide in a concentration of about 10 mg. per liter, and curve I represents the sensitivity of the same emulsion containing 2,2'-diethyl-8-methyloxathiacarbocyanine iodide and 2,1'-diethyl-4-chlorothia-2'-cyanine iodide each in a concentration of about 10 mg. per liter.

In Fig. 4, curve J represents the sensitivity of an ordinary silver bromide emulsion containing 2,2',8-triethyloxaselenacarbocyanine iodide in a concentration of about 10 mg. per liter; curve K represents the sensitivity of the same emulsion containing 2,1'-diethyl-4-chlorothia-2'-cyanine iodide in a concentration of about 10 mg. per liter, and curve L represents the same emulsion containing 2,2',-8-triethyloxaselenacarbocyanine iodide and 2,1'-diethyl-4-chlorothia-2'-cyanine iodide each in a concentration of about 10 mg. per liter.

The spectrograms corresponding to the figures of the accompanying drawing were made in a grating spectrograph with an optical wedge having an optical density gradient of 1.0 for each horizontal line in the spectrogram. Where the spectrograms were compared as in each of the figures of the drawing, the exposures were for the same time and test plates of each group were developed together.

Still further examples showing the application of my invention could be cited, but the foregoing will be sufficient to teach those skilled in the art the manner in which my invention is carried out and the principles of sensitizing photographic emulsions with supersensitizing combinations such as described herein.

Cyanine dyes containing hydroxyalkyl groups can be prepared from cyclammonium quaternary salts prepared by reacting heterocyclic nitrogen bases with halohydrins, e. g. ethylene halohydrins and propylene halohydrins. It is advantageous to employ the bromohydrins. The heterocyclic nitrogen base and the bromohydrin are merely heated together for several hours, e. g. 25 to 30 hours or longer, at about 100° C., though 150° C. can be employed. An excess of the bromohydrin is advantageously employed. Following the reaction, the solid reaction product is advantageously converted to the iodide by treatment with potassium iodide. This can be accomplished by dissolving the crude quaternary bromide in hot water and treating the solution with a hot aqueous solution of potassium iodide (1 g. per cc. of water). Cyanine dyes containing hydroxyalkyl groups are described in the application of Leslie G. S. Brooker and Lloyd A. Smith, Serial No. 133,524, filed of even date herewith.

The arylo-oxazole nuclei, such as benzoxazole and naphthoxazole nuclei for example, are more properly referred to as aroxazole nuclei. Likewise the arylothiazole and aryloselenazole nuclei, such as benzothiazole, benzoselenazole and naphthothiazole nuclei for example, are more properly referred to as arothiazole and aroselenazole nuclei. In these aroxazole, arothiazole and aroselenazole nuclei, the position adjacent to the azole nitrogen atom is known as the alpha position. Thus, in the case of the aroxazole nucleus, benzoxazole, the alpha position is as shown in the following formula:

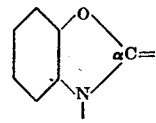

What I claim and desire to be secured by Letters Patent of the United States is:

1. A photographic silver halide emulsion containing a supersensitizing combination of at least one sensitizing pseudocyanine dye with at least one sensitizing carbocyanine dye selected from the group consisting of 8-alkyloxathiacarbocyanine dyes, 8-alkyloxaselenacarbocyanine dyes, 8-alkyl-3,4-benzoxathiacarbocyanine dyes, 8-alkyl-3,4-benzoxaselenacarbocyanine dyes, 8-alkyl-3',4'-benzoxathiacarbocyanine dyes and 8-alkyl-3,4,3',4'-dibenzoxathiacarbocyanine dyes.

2. A photographic gelatino-silver-halide emulsion containing a supersensitizing combination of at least one sensitizing pseudocyanine dye with at least one sensitizing carbocyanine dye selected from the group consisting of 8-alkyloxathiacarbocyanine dyes, 8-alkyloxaselenacarbocyanine dyes, 8-alkyl-3,4-benzoxathiacarbocyanine dyes, 8-alkyl-3,4-benzoxaselenacarbocyanine dyes, 8-alkyl-3',4'-benzoxathiacarbocyanine dyes and 8-alkyl-3,4,3',4'-dibenzoxathiacarbocyanine dyes.

3. A photographic gelatino-silver-halide emulsion containing a supersensitizing combination, one sensitizing pseudocyanine dye selected from the group consisting of 2,2'-cyanine dyes, thia-2'-cyanine dyes, selena-2'-cyanine dyes, 4-phenyloxazolo-2'-cyanine dyes and 3,4-benzothia-2'-cyanine dyes, with at least one sensitizing carbocyanine dye selected from the group consisting of 8-alkyloxathiacarbocyanine dyes, 8-alkyloxaselenacarbocyanine dyes, 8-alkyl-3,4-benzoxathiacarbocyanine dyes, 8-alkyl-3,4-benzoxaselenacarbocyanine dyes, 8-alkyl-3',4'-benzoxathiacarbocyanine dyes and 8-alkyl-3,4,3',4'-dibenzoxathiacarbocyanine dyes.

4. A photographic gelatino-silver-halide emulsion containing a supersensitizing combination of at least one sensitizing 8-alkyl-3,4-benzoxathiacarbocyanine dye with at least one sensitizing pseudocyanine dye.

5. A photographic gelatino-silver-halide emulsion containing a supersensitizing combination of at least one sensitizing 8-alkyl-3',4'-benzoxathiacarbocyanine dye with at least one sensitizing pseudocyanine dye.

6. A photographic gelatino-silver-halide emulsion containing a supersensitizing combination of at least one sensitizing 8-alkyl-3,4,3',4'-dibenzoxathiacarbocyanine dye with at least one sensitizing pseudocyanine dye.

7. A photographic gelatino-silver-halide emulsion containing a supersensitizing combination of at least one sensitizing 2,2'-dialkyl-8-ethyl-3,4-benzoxathiacarbocyanine halide in which each of the 2- and 2'-alkyl groups contains from one to four carbon atoms, with at least one sensitizing 3,1'-dialkyl-4-phenyloxazolo-2'-cyanine halide in which each of the 3- and 1'-alkyl groups contains from one to four carbon atoms.

8. A photographic gelatino-silver-halide emulsion containing a supersensitizing combination of at least one sensitizing 2,2'-dialkyl-8-ethyl-3',4'-benzoxathiacarbocyanine halide in which each of the 2- and 2'-alkyl groups contains from one to four carbon atoms, with at least one sensitizing 2,1'-dialkylthia-2'-cyanine halide in which each of the 2- and 1'-alkyl groups contains from one to four carbon atoms.

9. A photographic gelatino-silver-halide emulsion containing a supersensitizing combination of at least one sensitizing 2,2'-dialkyl-8-ethyl-3,4,3',4'-dibenzoxathiacarbocyanine halide in which each of the 2- and 2'-alkyl groups contains from one to four carbon atoms, with at least one sensitizing 1,1'-dialkyl-2,2'-cyanine halide in which each of the 1-alkyl and 1'-alkyl groups contains from one to four carbon atoms.

10. A photographic gelatino-silver-halide emulsion containing a supersensitizing combination of at least one sensitizing 2,1'dialkylthia-2'-cyanine dye in which each of the alkyl groups contains from one to four carbon atoms, with at least one sensitizing carbocyanine dye selected from the group consisting of 2,2'-dialkyl-8-alkyloxathiacarbocyanine dyes, 2,2'-dialkyl-8-alkyloxaselenacarbocyanine dyes, 2,2'-dialkyl-8-alkyl-3,4-benzoxathiacarbocyanine dyes, 2,2'-dialkyl-8-alkyl-3,4-benzoxaselenacarbocyanine dyes, 2,2'-dialkyl - 8 - alkyl - 3',4'-benzoxathiacarbocyanine dyes and 2,2'-dialkyl-8-alkyl-3,4,3',4'-dibenzoxathiacarbocyanine dyes in which each of the 8-alkyl groups is an alkyl group selected from the group consisting of methyl and ethyl and each of the 2-alkyl and 2'-alkyl groups contains from one to four carbon atoms.

11. A photographic gelatino-silver-halide emulsion containing a supersensitizing combination of at least one sensitizing 1,1'-dialkyl-2,2'-cyanine dye in which each of the alkyl groups contains from one to four carbon atoms, with at least one sensitizing carbocyanine dye selected from the group consisting of 2,2'-dialkyl-8-alkyloxathiacarbocyanine dyes, 2,2'-dialkyl-8-alkyloxaselenacarbocyanine dyes, 2,2'-dialkyl-8-alkyl-3,4-benzoxathiacarbocyanine dyes, 2,2'-dialkyl-8-alkyl-3,4-benzoxaselenacarbocyanine dyes, 2,2'-dialkyl - 8 - alkyl - 3',4'-benzoxathiacarbocyanine dyes and 2,2'-dialkyl-8-alkyl-3,4,3',4'-dibenzoxathiacarbocyanine dyes in which each of the 8-alkyl groups is an alkyl group selected from the group consisting of methyl and ethyl and each of the 2-alkyl and 2'-alkyl groups contains from one to four carbon atoms.

12. A photographic gelatino-silver-halide emulsion containing a supersensitizing combination of at least one sensitizing 3,1'-dialkyl-4-phenyloxazolo-2'-cyanine dye in which each of the alkyl groups contains from one to four carbon atoms, with at least one sensitizing carbocyanine dye selected from the group consisting of 2,2'-dialkyl-8-alkyloxathiacarbocyanine dyes, 2,2'-dialkyl-8-alkyloxaselenacarbocyanine dyes, 2,2'-dialkyl - 8 - alkyl - 3,4 - benzoxathiacarbocyanine dyes, 2,2'-dialkyl-8-alkyl-3',4'-benzoxaselenacarbocyanine dyes, 2,2'-dialkyl-8-alkyl-3',4'-benzoxathiacarbocyanine dyes and 2,2'-dialkyl-8-alkyl-3,4,3',4'-dibenzoxathiacarbocyanine dyes in which each of the 8-alkyl groups is an alkyl group selected from the group consisting of methyl and ethyl and each of the 2-alkyl and 2'-alkyl groups contains from one to four carbon atoms.

13. A photographic gelatino-silver-halide emulsion containing a supersensitizing combination of at least one sensitizing 2,2'-dimethyl-8-ethyl-3',4'-benzoxathiacarbocyanine dye with at least one sensitizing 2,1'-diethylthia-2'-cyanine dye.

BURT H. CARROLL.